United States Patent
Kumagai

(10) Patent No.: US 9,530,084 B2
(45) Date of Patent: Dec. 27, 2016

(54) IMAGE PROCESSING APPARATUS CAPABLE OF ASCERTAINING PRINTING REDUCTION EFFECT, CONTROL METHOD THEREFOR, STORAGE MEDIUM, AND IMAGE PROCESSING SYSTEM

(71) Applicant: CANON KABUSHIKI KAISHA, Tokyo (JP)

(72) Inventor: Takekazu Kumagai, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/626,413

(22) Filed: Feb. 19, 2015

(65) Prior Publication Data
US 2015/0242734 A1    Aug. 27, 2015

(30) Foreign Application Priority Data
Feb. 21, 2014   (JP) ................. 2014-031906

(51) Int. Cl.
G06K 15/02   (2006.01)
G06K 15/00   (2006.01)
H04N 1/00   (2006.01)

(52) U.S. Cl.
CPC ........... *G06K 15/1886* (2013.01); *G06K 15/40* (2013.01); *H04N 1/00* (2013.01); *G06K 15/4065* (2013.01)

(58) Field of Classification Search
None
See application file for complete search history.

(56) References Cited

U.S. PATENT DOCUMENTS

| | | | |
|---|---|---|---|
| 2010/0118329 A1 | 5/2010 | Fujiki et al. | |
| 2011/0317214 A1* | 12/2011 | Hamada et al. | G06F 3/1203 358/1.15 |
| 2012/0033251 A1* | 2/2012 | Okada et al. | G06F 3/1212 358/1.15 |
| 2015/0029536 A1* | 1/2015 | Suzuki et al. | G06F 21/608 358/1.14 |

FOREIGN PATENT DOCUMENTS

| | | | |
|---|---|---|---|
| JP | 2006211229 A | * | 8/2006 |
| JP | 2009-148909 A | | 7/2009 |

* cited by examiner

*Primary Examiner* — Thomas D Lee
(74) *Attorney, Agent, or Firm* — Rossi, Kimms & McDowell LLP

(57) ABSTRACT

An image processing apparatus which makes it possible to ascertain the concrete number of recording sheets that have been saved. Data is stored in an HDD of the image processing apparatus. The stored data is deleted based on an instruction from a user or a lapse of a predetermined time period. A deletion log including information indicative of whether the print data has not been printed or has been printed is recorded based on deletion of the data.

7 Claims, 16 Drawing Sheets

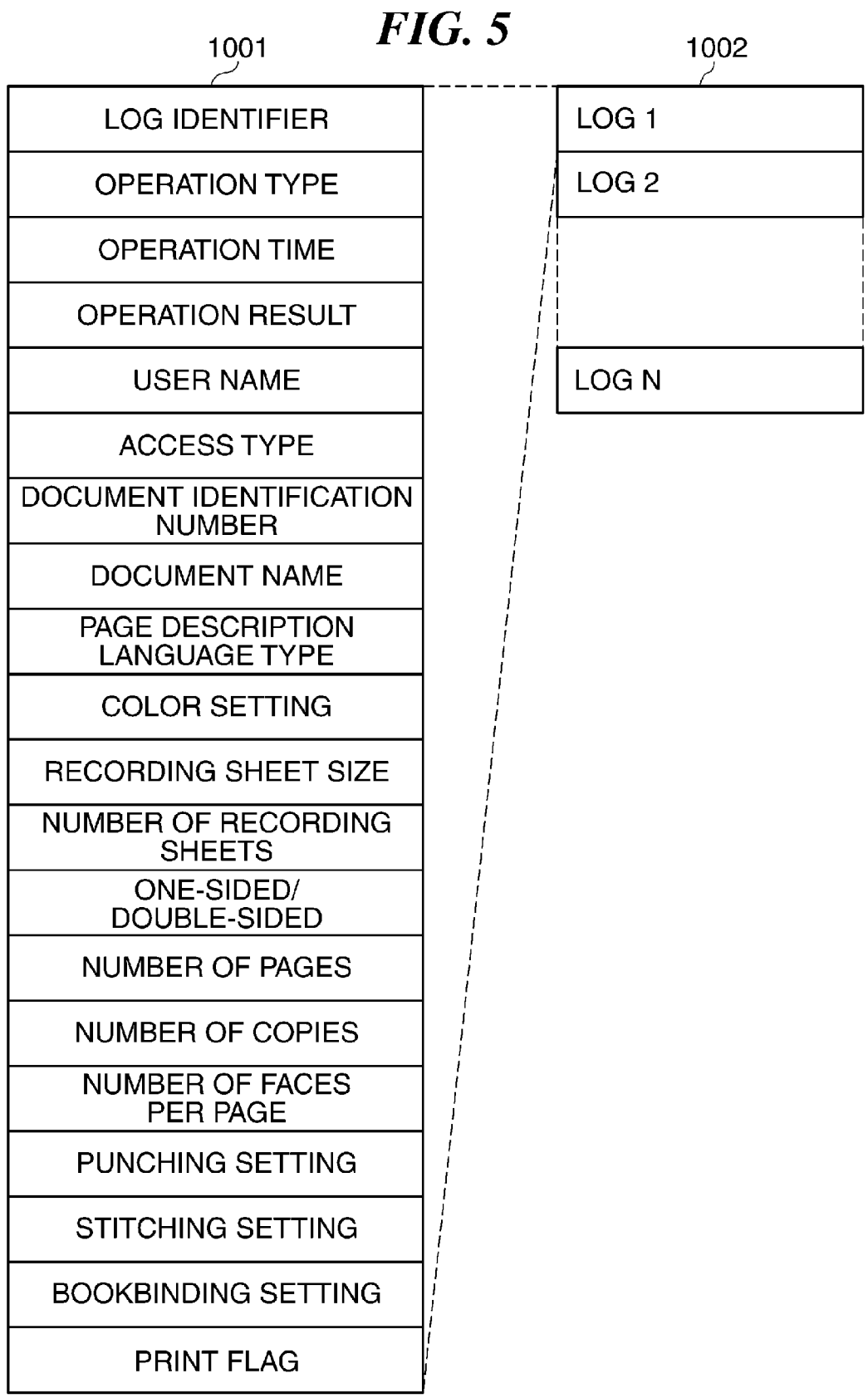

FIG. 6

| OPERATION TYPE | OPERATION TIME | OPERATION RESULT | USER NAME | ACCESS TYPE | DOCUMENT NAME | NUMBER OF COPIES | NUMBER OF PAGES | ONE-SIDED/ DOUBLE-SIDED | NUMBER OF FACES PER PAGE | PRINT FLAG |
|---|---|---|---|---|---|---|---|---|---|---|
| DOCUMENT SUBMISSION | 12/15 9:30 | OK | User1 | Printer Driver | NEWS_Letter1 | 5 | 8 | ONE-SIDED | 1 | - |
| DOCUMENT SUBMISSION | 12/15 9:35 | OK | User1 | Printer Driver | NEWS_Letter2 | 5 | 2 | DOUBLE-SIDED | 2 | - |
| DOCUMENT SUBMISSION | 12/15 9:38 | OK | User2 | Printer Driver | Report1 | 1 | 3 | ONE-SIDED | 1 | - |
| DELETION | 12/15 9:40 | OK | User1 | Control Panel | NEWS_Letter1 | 5 | 8 | ONE-SIDED | 1 | NOT PRINTED |
| PRINT | 12/15 9:41 | OK | User1 | Control Panel | NEWS_Letter2 | 5 | 4 | ONE-SIDED | 1 | - |
| DELETION | 12/15 9:42 | OK | System | System | NEWS_Letter2 | 5 | 4 | ONE-SIDED | 1 | PRINTED |
| DOCUMENT SUBMISSION | 12/15 9:45 | OK | User2 | Printer Driver | Pictures1 | 1 | 2 | ONE-SIDED | 1 | - |
| CHANGE OF PRINT SETTINGS | 12/15 9:45 | OK | User2 | Control Panel | Pictures1 | 1 | 1 | ONE-SIDED | 2 | - |
| PRINT | 12/15 9:47 | OK | User2 | Control Panel | Pictures1 | 1 | 1 | ONE-SIDED | 2 | - |

| OPERATION TYPE | OPERATION TIME | OPERA-TION RESULT | USER NAME | ACCESS TYPE | DOCUMENT NAME | NUMBER OF COPIES | NUMBER OF PAGES | ONE-SIDED/DOUBLE-SIDED | NUMBER OF FACES PER PAGE | PRINT FLAG |
|---|---|---|---|---|---|---|---|---|---|---|
| DOCUMENT SUBMISSION | 12/15 9:30 | OK | User1 | Printer Driver | NEWS_Letter1 | 5 | 8 | ONE-SIDED | 1 | - |
| DOCUMENT SUBMISSION | 12/15 9:35 | OK | User1 | Printer Driver | NEWS_Letter2 | 5 | 2 | DOUBLE-SIDED | 2 | - |
| DOCUMENT SUBMISSION | 12/15 9:38 | OK | User2 | Printer Driver | Report1 | 1 | 3 | ONE-SIDED | 1 | - |
| DELETION | 12/15 9:40 | OK | User1 | Control Panel | NEWS_Letter1 | 5 | 8 | ONE-SIDED | 1 | NOT PRINTED |
| PRINT | 12/15 9:41 | OK | User1 | Control Panel | NEWS_Letter2 | 5 | 4 | ONE-SIDED | 1 | - |
| DELETION | 12/15 9:42 | OK | System | System | NEWS_Letter2 | 5 | 4 | ONE-SIDED | 1 | PRINTED |
| DOCUMENT SUBMISSION | 12/15 9:45 | OK | User2 | Printer Driver | Pictures1 | 1 | 2 | ONE-SIDED | 1 | - |
| CHANGE OF PRINT SETTINGS | 12/15 9:45 | OK | User2 | Control Panel | Pictures1 | 1 | 1 | ONE-SIDED | 2 | - |
| PRINT | 12/15 9:47 | OK | User2 | Control Panel | Pictures1 | 1 | 1 | ONE-SIDED | 2 | - |

OPERATION LOG LIST SCREEN — 600

| OPERATION TYPE | OPERATION TIME | OPERA-TION RESULT | USER NAME | ACCESS TYPE | DOCUMENT NAME | NUMBER OF COPIES | NUMBER OF PAGES | ONE-SIDED/DOUBLE-SIDED | NUMBER OF FACES PER PAGE | PRINT FLAG |
|---|---|---|---|---|---|---|---|---|---|---|
| DOCUMENT SUBMISSION | 12/15 9:30 | OK | User1 | Printer Driver | NEWS_Letter1 | 5 | 8 | ONE-SIDED | 1 | - |
| DOCUMENT SUBMISSION | 12/15 9:35 | OK | User1 | Printer Driver | NEWS_Letter2 | 5 | 2 | DOUBLE-SIDED | 2 | - |
| DOCUMENT SUBMISSION | 12/15 9:38 | OK | User2 | Printer Driver | Report1 | 1 | 3 | ONE-SIDED | 1 | - |
| DELETION | 12/15 9:40 | OK | User1 | Control Panel | NEWS_Letter1 | 5 | 8 | ONE-SIDED | 1 | NOT PRINTED |
| PRINT | 12/15 9:41 | OK | User1 | Control Panel | NEWS_Letter2 | 5 | 4 | ONE-SIDED | 1 | - |
| DELETION | 12/15 9:42 | OK | System | Control Panel | NEWS_Letter2 | 5 | 4 | ONE-SIDED | 1 | PRINTED |
| DOCUMENT SUBMISSION | 12/15 9:45 | OK | User2 | Printer Driver | Pictures1 | 1 | 2 | ONE-SIDED | 1 | - |
| CHANGE OF PRINT SETTINGS | 12/15 9:45 | OK | User2 | Control Panel | Pictures1 | 1 | 1 | ONE-SIDED | 2 | - |
| PRINT | 12/15 9:47 | OK | User2 | Control Panel | Pictures1 | 1 | 1 | ONE-SIDED | 2 | - |

602 — SAVE LOG    603 — CLOSE

FIG. 10

| LOG TYPE | OPERATION TYPE | OPERATION TIME | OPERATION RESULT | USER NAME | ACCESS TYPE | DOCUMENT NAME | NUMBER OF COPIES | NUMBER OF PAGES | PRINT FLAG |
|---|---|---|---|---|---|---|---|---|---|
| OPERATION LOG | DOCUMENT SUBMISSION | 12/15 9:30 | OK | User1 | Printer Driver | NEWS_Letter1 | 5 | 8 | - |
| OPERATION LOG | DOCUMENT SUBMISSION | 12/15 9:35 | OK | User1 | Printer Driver | NEWS_Letter2 | 5 | 4 | - |
| OPERATION LOG | DOCUMENT SUBMISSION | 12/15 9:38 | OK | User2 | Printer Driver | Report1 | 1 | 3 | - |
| OPERATION LOG | DELETION | 12/15 9:40 | OK | User1 | Control Panel | NEWS_Letter1 | 5 | 8 | NOT PRINTED |
| JOB LOG | PRINT | 12/15 9:41 | OK | User1 | Control Panel | NEWS_Letter2 | 5 | 4 | - |
| OPERATION LOG | DELETION | 12/15 9:42 | OK | User1 | Control Panel | NEWS_Letter2 | 5 | 4 | PRINTED |
| OPERATION LOG | DOCUMENT SUBMISSION | 12/15 9:45 | OK | User2 | Printer Driver | Pictures1 | 1 | 2 | - |
| OPERATION LOG | CHANGE | 12/15 9:45 | OK | User2 | Control Panel | Pictures1 | 1 | 1 | - |

FIG. 11

DELETED DOCUMENT LIST SCREEN 800

NUMBER OF DOCUMENTS DELETED WITHOUT BEING PRINTED 20 DOCUMENTS — 801

NUMBER OF SAVED RECORDING SHEETS 153 SHEETS — 802

NUMBER OF USERS WHO DELETED DOCUMENTS WITHOUT PERFORMING PRINTING 6 — 803

| USER NAME | ACCESS TYPE | DOCUMENT NAME | NUMBER OF COPIES | NUMBER OF PAGES | ONE-SIDED/DOUBLE-SIDED | NUMBER OF FACES PER PAGE | NUMBER OF RECORDING SHEETS |
|---|---|---|---|---|---|---|---|
| User1 | Control Panel | NEWS_Letter1 | 5 | 8 | ONE-SIDED | 1 | 40 |
| User3 | Control Panel | Invitation | 1 | 2 | ONE-SIDED | 2 | 1 |
| System | System | Greeting | 20 | 2 | ONE-SIDED | 1 | 40 |
| System | System | Invitation | 20 | 1 | ONE-SIDED | 1 | 20 |
| System | System | Ticket | 20 | 1 | ONE-SIDED | 1 | 20 |

804

CLOSE — 805

FIG. 12

DOCUMENT LIST SCREEN

NUMBER OF DOCUMENTS PRINTED AFTER PRINT SETTINGS WERE CHANGED — 10 DOCUMENTS ~901

NUMBER OF RECORDING SHEETS SAVED BY CHANGING SETTINGS — 126 SHEETS ~902

NUMBER OF USERS WHO PRINTED DOCUMENTS AFTER CHANGING SETTINGS — 6 ~903

| USER NAME | DOCUMENT NAME | NUMBER OF SHEETS AT TIME OF SUBMISSION | NUMBER OF DOCUMENTS AT TIME OF PRINTING |
|---|---|---|---|
| User2 | Pictures1 | 2 | 1 |
| User4 | Map | 2 | 1 |
| User6 | Document1 | 40 | 8 |
| User2 | Eagles | 20 | 40 |
| User2 | Giants | 40 | 10 |

CLOSE ~905

IMAGE PROCESSING APPARATUS CAPABLE OF ASCERTAINING PRINTING REDUCTION EFFECT, CONTROL METHOD THEREFOR, STORAGE MEDIUM, AND IMAGE PROCESSING SYSTEM

BACKGROUND OF THE INVENTION

Field of the Invention

The present invention relates to an image processing apparatus, a control method therefor, a storage medium, and an image processing system, and in particular to an image processing apparatus which is capable of positively ascertaining a wasteful printing reduction effect, a control method therefor, a storage medium, and an image processing system.

Description of the Related Art

In recent years, user's awareness about saving of recording sheets for use in printing has become established, and there is demand from users to ascertain the effect of saving recording sheets. To save recording sheets, for example, reserve printing as well as double-sided printing and layout printing is used. Reserve printing can reduce erroneous printing and abandoned printing discarded without being collected by anyone after printing and can effectively decrease wasteful recording sheets.

Additionally, there are image forming apparatuses which in order to reduce wasteful printing repeatedly performed for print data with the same file name received from the same sender and wasteful printing performed so as to modify print conditions that have been set, do not perform wasteful printing based on a match rate indicative of the degree to which print data received and printed first and print data received later match each other (see, for example, Japanese Laid-Open Patent Publication (Kokai) No. 2009-148909).

However, according to either of the recording sheet saving methods described above, it is impossible to ascertain the effect of reducing wasteful printing although it is possible to save recording sheets. In particular, even when a printing apparatus has received print data once but has not printed the print data, or when the printing apparatus has changed settings on print conditions but has not printed print data before changing the settings, the number of saved recording sheets cannot be grasped.

SUMMARY OF THE INVENTION

The present invention provides an image processing apparatus and a control method therefor, which make it possible to ascertain the concrete number of recording sheets that have been saved, a storage medium, and an image processing system.

Accordingly, a first aspect of the present invention provides an image processing apparatus capable of printing data stored in a storage unit, comprising a deletion unit configured to delete the data stored in the storage unit based on an instruction from a user or a lapse of a predetermined time period, and a recording unit configured to record a deletion log including information indicative of whether the data has not been printed or has been printed based on deletion of the data by the deletion unit.

Accordingly, a second aspect of the present invention provides a control method for an image processing apparatus capable of printing data stored in a storage unit, comprising a deletion step of deleting the print data stored in the storage unit based on an instruction from a user or a lapse of a predetermined time period, and a recording step of recording a deletion log including information indicative of whether the data has not been printed or has been printed based on deletion of the data in the deletion step.

Accordingly, a third aspect of the present invention provides a non-transitory computer-readable storage medium storing a program for causing a computer to execute a control method for an image processing apparatus capable of printing data stored in a storage unit, comprising a deletion step of deleting the print data stored in the storage unit based on an instruction from a user or a lapse of a predetermined time period, and a recording step of recording a deletion log including information indicative of whether the data has not been printed or has been printed based on deletion of the data in the deletion step.

Accordingly, a fourth aspect of the present invention provides an image processing system comprising an image processing apparatus comprising a storage unit that stores data, a deletion unit that deletes the data stored in the storage unit, and a recording unit that records a deletion log including information indicative of whether the print data has not been printed or has been printed based on deletion of the data by the deletion unit, and an information processing apparatus configured to be connected to the image processing apparatus, wherein the deletion log of the image processing apparatus is recorded in the recording unit by way of the information processing apparatus.

According to the present invention, an operation log of print data is accumulated, and based on the accumulated operation logs, the number of print data deleted without being printed and the number of recording sheets saved by deleting the print data as well as the number of print data printed after settings are changed and the number of recording sheets saved by changing the settings on the print data are displayed. Thus, the concrete number of recording sheets that have been saved is ascertained.

Further features of the present invention will become apparent from the following description of exemplary embodiments (with reference to the attached drawings).

BRIEF DESCRIPTION OF THE DRAWINGS

FIG. 5 is a view useful in explaining an arrangement for managing operation logs of the printing apparatus managed based on log information stored in a log information storage unit in FIG. 3.

FIG. 6 is a view useful in explaining an operation log table stored in an operation management table in FIG. 5.

FIG. 7 is a view useful in explaining an operation log table which is stored in the operation management table in FIG. 5.

FIG. 9 is a view useful in explaining an operation log list screen which is displayed when a log display button in FIG. 8 is depressed.

FIG. 10 is a view useful in explaining a log list file in a comma-delimited file format which is created when a log save button in FIG. 8 is depressed.

FIG. 11 is a view useful in explaining a deleted document list screen which is displayed when a deleted document list display button in FIG. 8 is depressed.

FIG. 12 is a view useful in explaining a document list screen which is displayed when a document list display button in FIG. 8 is depressed.

DESCRIPTION OF THE EMBODIMENTS

The present invention will now be described in detail with reference to the drawings showing an embodiment thereof.

Figure 1:
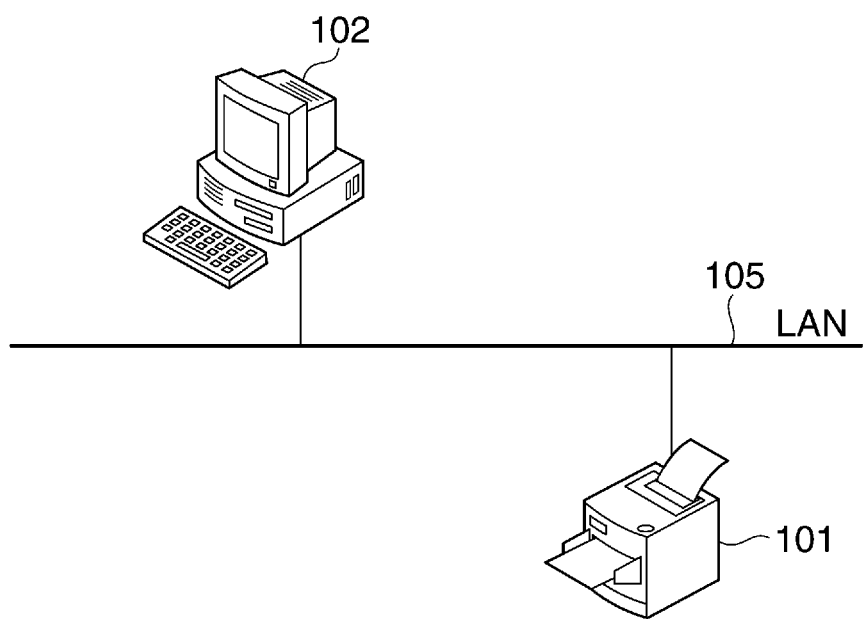
FIG. 1 is a block diagram schematically showing an arrangement of an image processing system having a printing apparatus which is an image processing apparatus according to an embodiment of the present invention.

FIG. 1 is a block diagram schematically showing an arrangement of an image processing system having a printing apparatus 101 which is an image processing apparatus according to an embodiment of the present invention.

The image processing system in FIG. 1 is comprised of the printing apparatus 101 and a PC 102, which is an information processing apparatus, and the printing apparatus 101 and the PC 102 are connected together via a LAN 105.

The printing apparatus 101 prints print data transmitted from the PC 102. The PC 102 has, for example, an application having a function of printing documents, and a printer driver, and through the PC 102, a user instructs the printing apparatus 101 to perform printing via the printer driver. The PC 102 is able to execute web applications of the printing apparatus 101 via a web browser.

Figure 2:
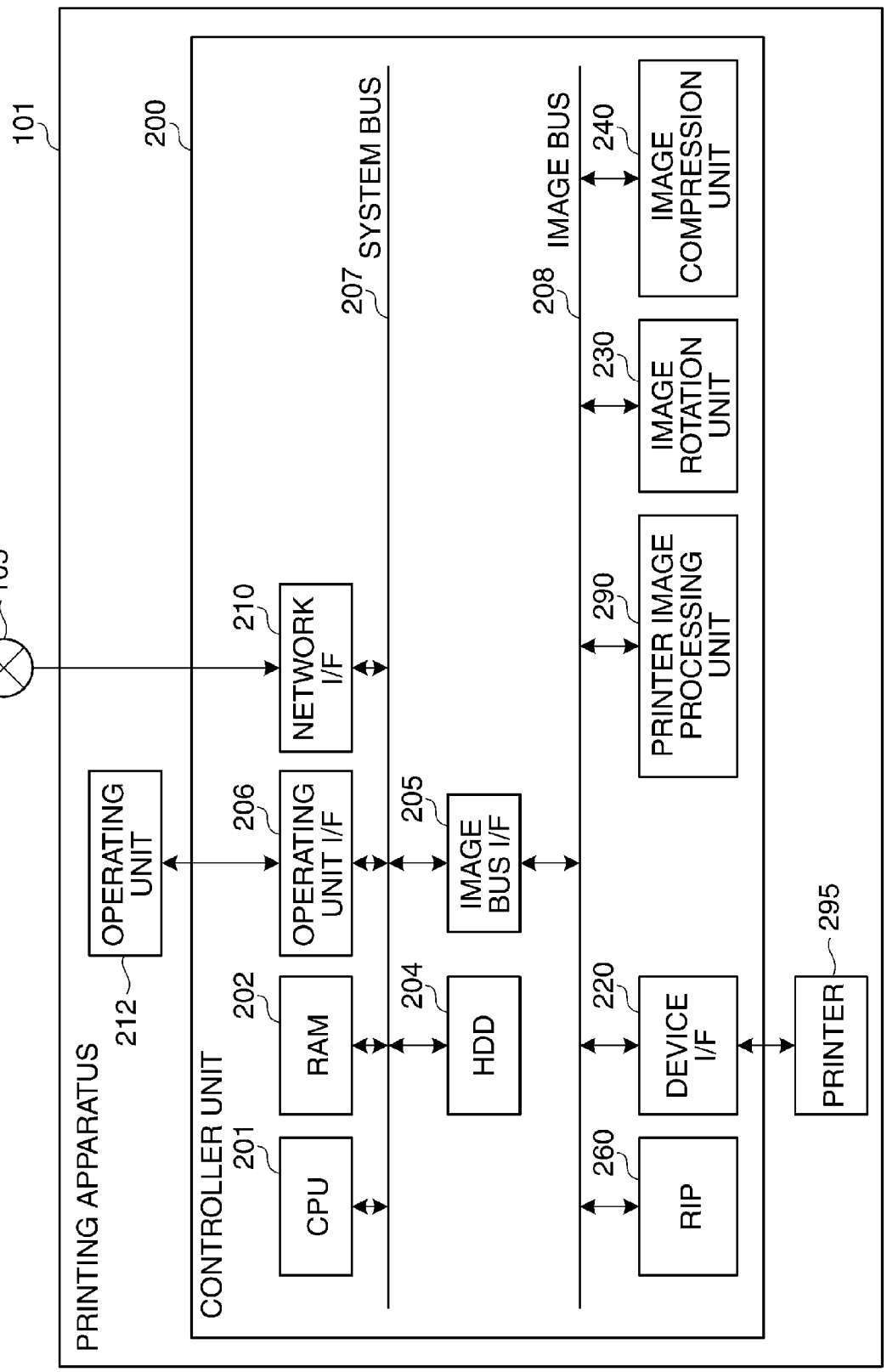
FIG. 2 is a block diagram schematically showing an internal arrangement of the printing apparatus in FIG. 1.

FIG. 2 is a block diagram schematically showing an internal arrangement of the printing apparatus 101 in FIG. 1.

Referring to FIG. 2, the printing apparatus 101 has a controller unit 200, an operating unit 212, and a printer 295.

The controller unit 200 has a CPU 201, a RAM 202, an HDD 204, an image bus I/F 205, an operating unit I/F 206, and a network I/F 210, which are connected to one another via a system bus 207. The controller unit 200 also has a device I/F 220, an image rotation unit 230, an image compression unit 240, a RIP 260, and a printer image processing unit 290, which are connected to one another via an image bus 208.

The system bus 207 and the image bus 208 are connected to each other via the image bus I/F 205 which is a bus bridge. The image bus 208 is capable of transferring image data at high speed and comprised of a PCI bus or IEEE 1394.

The operating unit 212 and the printer 295 are connected to the operating unit I/F 206 and the device I/F 220, respectively. The LAN 105 is connected to the network I/F 210.

The controller unit 200 controls input and output of print data, device information, and so on. The CPU 201 starts an operating system using a boot program stored in the HDD 204 and also executes application programs, which are stored in the HDD 204, on the operating system.

The RAM 202 is a work area for the CPU 201 and temporarily stores image data. The HDD 204 stores print data, image data, log information, user information, and device setting information as well as the boot program and the application programs mentioned above. A solid-state drive may be used in place of the HDD 204. The operating unit 212 has a touch panel and a plurality of hardware keys.

The device I/F 220 carries out synchronous-to-asynchronous conversion of image data. The image rotation unit 230 rotates image data. The image compression unit 240 carries out JPEG compression-decompression of multivalued image data, JBIG compression-decompression, MMR compression-decompression, or MH compression-decompression of binary-coded image data. The RIP 260 is a processor which expands a PDL code described in a page description language (PDL) into a bitmap image. The printer image processing unit 290 performs stabilization of the printer 295, resolution conversion, and so on for printout image data. The printer 295 is an image output device.

Figure 3:
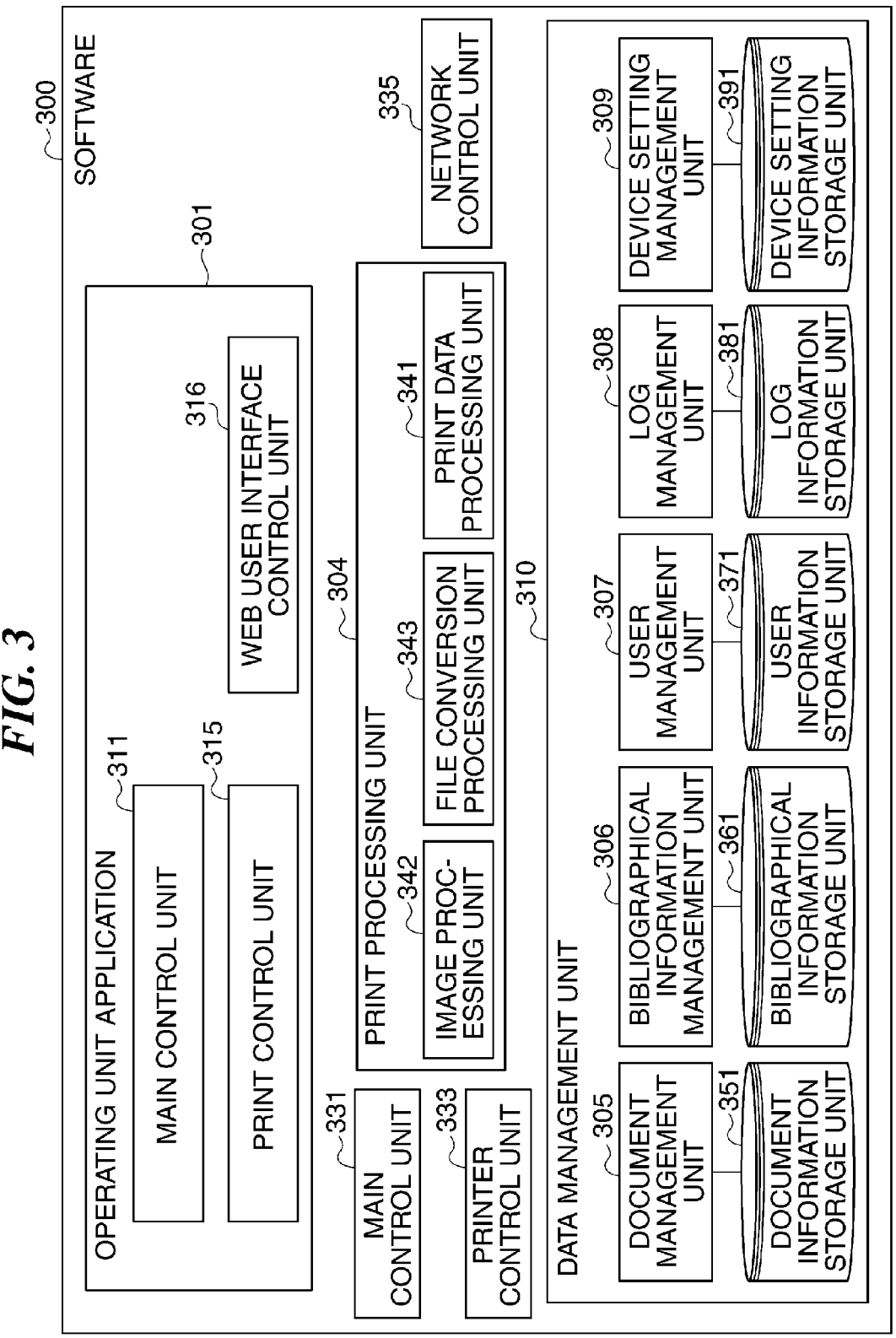
FIG. 3 is a block diagram schematically showing a software arrangement of an application program which is executed by the printing apparatus in FIG. 2.

FIG. 3 is a block diagram schematically showing an arrangement of software 300 of an application program which is executed by the printing apparatus 101 in FIG. 2.

The software 300 of the application program is executed by the CPU 201 of the image processing apparatus 101 in FIG. 2.

The software 300 has an operating unit application 301, a print processing unit 304, a data management unit 310, a device control unit 331, a printer control unit 333, and a network control unit 335.

The operating unit application 301 has a main control unit 311, a print control unit 315, and a web user interface control unit 316. The main control unit 311 controls input and output of information which are done by way of the operating unit 212. The print control unit 315 controls an accumulation process in which print data is accumulated in the HDD 204 of the printing apparatus 101 and a printing process in which print data is printed using the printing apparatus 101.

The web user interface control unit 316 controls transmission of web pages to a web browser running on the PC 102, which is connected to the printing apparatus 101 via the LAN 105, and reception of operational information on web pages and files by way of the network control unit 335. The web pages are comprised of, for example, HTML and JavaScript (registered trademark) and displayed on a web browser installed in a PC, a smartphone, a tablet terminal, or the like. The device control unit 331 controls the printer 295 using the printer control unit 333.

The print processing unit 304 has a print data processing unit 341, an image processing unit 342, and a file conversion processing unit 343. The print data processing unit 341 controls the RIP 206 to convert print data from a PDL code into a bitmap image and controls the image rotation unit 230 and the printer image processing unit 290 to process image data.

The image processing unit 342 performs conversion of full-color image data into black-and-white image data, monochromatic image data, two-color image data, or the like, compression or decompression of image data, and conversion of image data into print data.

The file conversion processing unit 343 converts PDF (Portable Document Format) data and XPS (XML Paper Specification) data into image data.

The data management unit 310 has a document management unit 305, a bibliographic information management unit 306, a user management unit 307, a log management unit 308, a device setting management unit 309, a document information storage unit 351, a bibliographic information storage unit 361, a user information storage unit 371, a log information storage unit 381, and a device setting information storage unit 391.

The document management unit 305 creates, changes, deletes, or peruses document data using image data or the like stored in the HDD 204, creates, changes, deletes, or peruses folders in which created documents are to be stored, changes attribute information on created document data and folders in which the document data is stored, and temporarily stores the document data. The created document data and folders are stored in the document information storage unit 351.

The bibliographic information management unit 306 creates, peruses, changes, or deletes bibliographic information on document data temporarily stored for reserve printing. The bibliographic information is stored in the bibliographic information storage unit 361. The user management unit 307 creates, peruses, changes, or deletes user data on users who use the apparatus, and the user data is stored in the user information storage unit 371.

The log management unit 308 creates, peruses, changes, or deletes log information on operation logs of the printing apparatus 101, and the log information is stored in the log information storage unit 381. The device setting management unit 309 is capable of perusing and changing settings as to operation of the printing apparatus 101, and the settings are stored in the device setting information storage unit 391.

Figure 4:
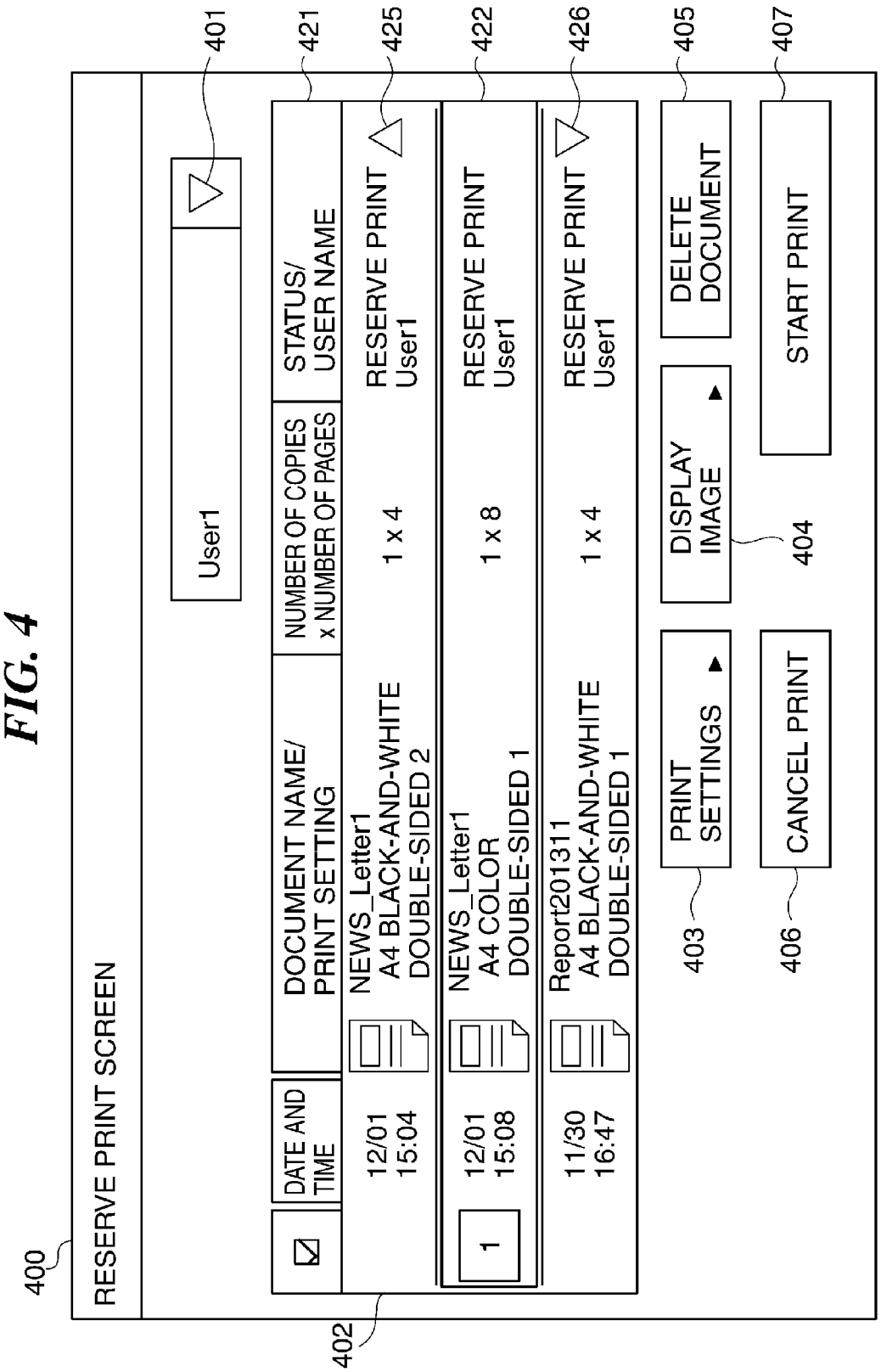
FIG. 4 is a view useful in explaining a reserve print screen displayed on an operating unit in FIG. 2.

FIG. 4 is a view useful in explaining a reserve print screen 400 which is displayed on the operating unit 212 in FIG. 2.

The reserve print screen 400 in FIG. 4 has a user selection part 401, a document list 402, a print setting button 403, an image display button 404, a document delete button 405, a print cancel button 406, and a print start button 407.

The user selection part 401 displays a pull-down list of users who have sent print data to the printing apparatus 101, and for example, "User1" is selected. The document list 402 is a list of print data sent to the printing apparatus 101 by "User1" selected in the user selection part 401, and includes a heading 421, document data 422, and scroll keys 425 and 426.

The heading 421 has a selection mark, date and time, document name/print settings, the number of copies×the number of pages, and status/user name. The selection mark is displayed for print data selected by a user among data displayed in the document list 402, and for example, "1" is displayed for the document data 422 which is print data. The date and time indicates the date and time at which the printing apparatus 101 received print data. The document name/print setting is written in two tiers; a document name which is a name of print data is displayed in the upper tier and settings as to print conditions (print settings) regarding the size of recording sheets, black-and-white/color printing, one-sided/double-sided printing, and layout printing are displayed in the lower tier.

As the number of copies×the number of pages, the number of copies to be made and the number of pages to be printed per copy are displayed. The status/user name is written in two tiers; in the upper tier, for example, such a print status as reserve printing, standby for printing, printing underway, or printing being canceled is displayed, and in the lower tier, a user name is displayed.

The scroll keys 425 and 426 are used when there are documents that cannot be displayed at a time in the document list 402. When the operating unit 212 supports flicking, they are allowed to be scrolled by flicking as well.

The print setting button 403 is depressed to change print conditions for the document data 422 on which a selection mark is placed in the document list 402. When the print setting button 403 is depressed, a print setting screen (not shown) is displayed.

The image display button 404 is depressed to display a print preview screen (not shown) for the document data 422 on which a selection mark is placed in the document list 402. The document delete button 405 is allowed to be depressed only when a print method for the document data 422 on which a selection mark is placed in the document list 402 is reserve printing, and when it is depressed, the target document data 422 is deleted by carrying out a print data deletion process in FIG. 16, which will be described later. When the document deletion button 405 is depressed, an ascertainment screen (not shown) for ascertaining whether or not to delete the targeted document data 422 before this document data 422 is deleted is displayed.

The print cancel button 406 is allowed to be depressed only when the document data 422 on which a selection mark is placed in the document list 402 and is waiting to be printed or in the process of being printed, and when it is depressed, printing of the document data 422 waiting to be printed or in the process of being printed is canceled. The print start button 407 is depressed only when a print method for the document data 422 on which a selection mark is placed in the document list 402 is reserve printing, and when it is depressed, printing of this document data 422 is started.

FIG. 5 is a view useful in explaining an arrangement for managing operation logs of the printing apparatus 101 managed based on log information stored in the log information storage unit 381 in FIG. 3.

Operational log information 1001 in FIG. 5 is comprised of a plurality of items required to manage operation logs, and in a log management table 1002, an operation log table 1100 in FIG. 6, to be described later, and an operation log table 1200 in FIG. 7, to be described later, which are comprised of items selected from the plurality of items, are stored, and the log management table 1002 is stored as log information in the log information storage unit 381. It should be noted that the log management table 1002 is stored in the log information storage unit 381 at, for example, submission, changing, deletion, or printing of print data.

The operation log information 1001 has, for example, items "log identifier", "operation type", "operation result", "user name", "access type", "document identification number", "document name", "page description language type", "color setting", "recording sheet size", "the number of recording sheets", "one-sided/double-sided", "the number of pages", "the number of copies", "the number of faces per page", "punching setting", "stitching setting", "bookbinding setting", and "print flag".

"Log identifier" indicates an identifier for identifying a plurality of items constituting the operation log information 1001, and "operation type" indicates the details of operation such as "document submission", "deletion", "printing", or "print setting change", and the "operation time" indicates the time at which an operation was performed. "Operation result" indicates a result of operation which has been performed. Specifically, when an operation has been completed with no error, "0" is recorded, and when an error has occurred during an operation, an error code indicative of a reason for failure is recorded.

"User name" indicates a name of a user who has performed an operation, and "access type" indicates a source of operation. As "access type", for example, "control panel" is recorded when a source of operation is the operating unit 212, "printer driver" is recorded when a source of operation is the printer driver of the PC 102, and "system" is recorded when a source of operation is a system which is executed in accordance with a program. "Document identification number" indicates a number for identifying document data comprised of multiple pieces of document data, "document name" indicates a name of print data received by the printing apparatus 101, and "page description language type" indicates a page description language used to instruct the printing apparatus 101 to perform printing.

"Color setting" indicates a print color setting such as black-and-white, color, or auto, and "recording sheet size" indicates a size of recording sheets such as A4, B4, or A3, and "the number of recording sheets" indicates the number of recording sheets required to perform printing in accordance with print conditions. "One-sided/double-sided" indicates one-sided printing or double-sided printing, "the number of pages" indicates the number of pages which print data has, the "the number of copies" indicates the number of copies to be made when print data is printed, and "the number of faces per page" indicates the number of pages in print data which is printed per page of printing sides of recording sheets (hereafter referred to as "the number of allocations").

"Punching setting" indicates a punching position, the number of holes, and so on; "none", "short side", "long side", or the like is set as a punching position, and "none", "2", "3", "4", or the like is set as the number of holes. "Stitching setting" indicates a stitching position, the number of stitches, and so on; "none", "short side", "long side", "upper left", "upper right", "lower right", "lower left", "middle", or the like is set as a stitching position, and "none", "single", "double", or the like is set as the number of stitches. "Bookbinding setting" indicates a record as to whether or not to perform bookbinding. "Print flag" indicates a record as to whether or not printing has been finished.

In the present embodiment, print data for which "deletion" is indicated for the item "operation type", and "not printed" is indicated for the item "print flag" is print data which is not required to be printed, and printing this print data wastes recording sheets. On the other hand, print data for which "deletion" is indicated for the item "operation type", and "printed" is indicated for the item "print flag" is print data which was required to be printed, and printing this print data wastes no recording sheets.

FIG. 6 is a view useful in explaining the operation log table 1100 which is stored in the operation management table 1002 in FIG. 5.

The operation log table 1100 in FIG. 6 is comprised of a plurality of operation log records including operation log records 1101 and 1102. In the operation log record 1101, "operation type" is "deletion", and "print flag" is "not printed", and in the operation log record 1102, "operation type" is "deletion", and "print flag" is "printed".

The operation log record 1101 shows that concerned document data was deleted, i.e. printing was not performed and 40 recording sheets (8 pages×5 copies) were not used. Namely, according to the operation log record 1101, no recording sheet was used so as to print document data determined to be unnecessary and then deleted, and hence waste of 40 recording sheets is avoided to save (reduce) 40 recording sheets as a result as compared to the case where "print flag" is "printed".

On the other hand, according to the operation log record 1102, printing was performed using 20 sheets (4 pages×5 copies), and after that, concerned document data was deleted. Namely, according to the operation log record 1102, document data required to be printed was printed and then deleted, and hence the 20 recording sheets used in printing are not wasted recording sheets. It should be noted that the operation log record 1102 is a deletion log indicating that the printing apparatus 101 automatically deleted the concerned document. The deletion log is recorded based on deletion of document data in a case where a predetermined time period has elapsed after the document data was stored in an accumulation unit.

FIG. 7 is a view useful in explaining the operation log table 1200 which is stored in an operation management table 1002 in FIG. 5.

The operation log table 1200 in FIG. 7 is comprised of a plurality of operation log records including operation log records 1201 to 1203. The operation log record 1201 shows an operation log at the time when print data corresponding to document data was submitted to the printing apparatus 101, the operation log record 1202 shows an operation log at the time when print settings on the submitted print data were changed, and the operation log record 1203 shows an operation log at the time when the print data for which the print settings were changed was printed.

According to the operation log record 1201, the number of pages was "2", whereas according to the operation log record 1202, the number of pages was changed to "1", and according to the operation log record 1203, the number of pages was kept at "1". Namely, the sequential operations corresponding to the operation log records 1201 to 1203 reduce the number of pages by 1, and this means that one recording sheet was saved as a result.

Figure 8:
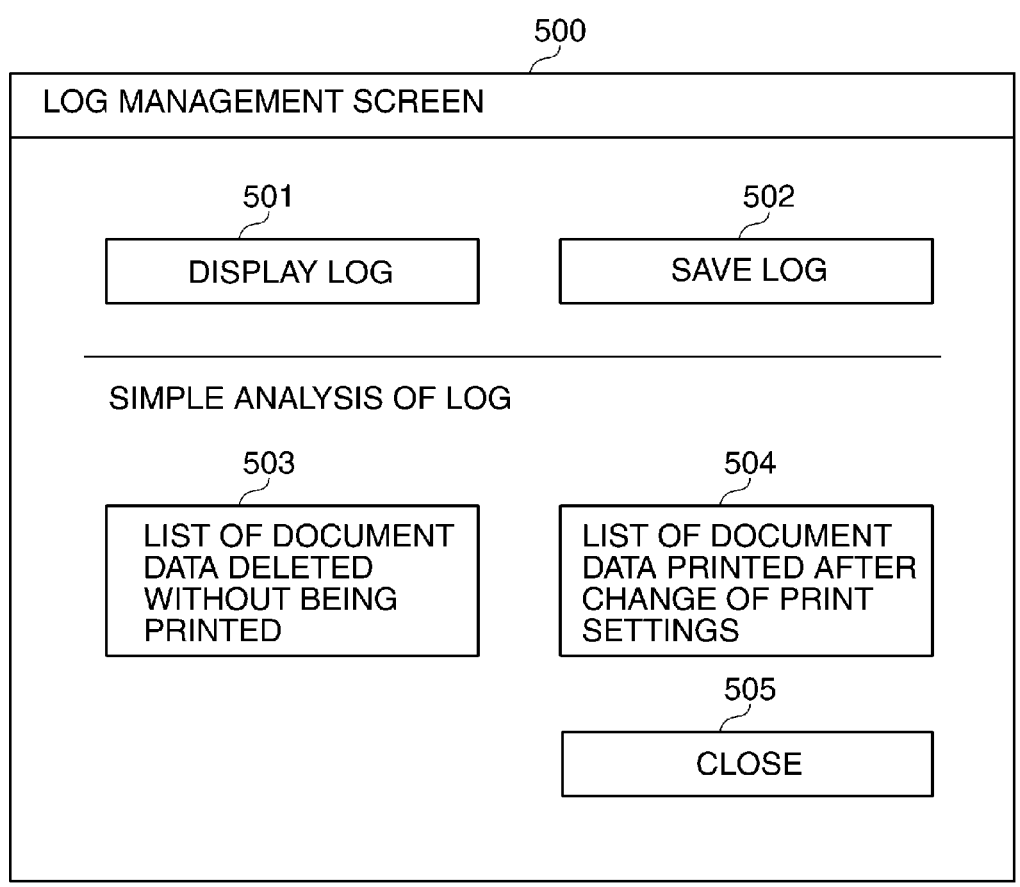
FIG. 8 is a view useful in explaining a log management screen which is displayed on a PC in FIG. 1.

FIG. 8 is a view useful in explaining a log management screen 500 which is displayed on the PC 102 in FIG. 1.

The log management screen 500 in FIG. 8 is displayed when a user manages logs, and for example, is displayed when a user accesses a URL of a web page constituting the log management screen 500 via a web browser running on the PC 102.

On the log management screen 500 in FIG. 8, a log display button 501 for displaying logs, a log save button 502 for saving logs, a deleted document list display button 503 for displaying a list of document data deleted without being printed, a setting-changed document list display button 504 for displaying a list of document data printed after changing of print settings, and a close button 505 are displayed.

When the log display button 501 is depressed, an operation log list screen 600 (FIG. 9), which is a list of logs of operations performed on the printing apparatus 101 by a user, is displayed.

On the operation log list screen 600 in FIG. 9, an operation log list 601, an operation log save button 602 for saving operation logs, and a close button 603 are displayed.

Among the plurality of items in the operation log information 1001 in FIG. 5, "operation type", "operation time", "operation result", "user name", "access type", "document name", "the number of copies", "the number of pages", "one-sided/double-sided", "the number of faces per page", and "print flag" are displayed in the operation log list 601.

When the operation log save button 602 for saving operation logs is depressed, logs of operations performed on the printing apparatus 101 by a user are stored in a storage destination designated by the user as with a case where the log storage button 502 is depressed as will be described later. When the close button 603 is depressed, the operation log list screen 600 is closed.

Referring again to FIG. 8, when the log save button 502 for saving logs is depressed, a file save screen (not shown) offered by way of a browser is displayed, and logs of operations on the printing apparatus 101 are stored as a log list file in a destination designated on the file storage screen. The log list file is, for example, a comma-delimited file (CSV file) (FIG. 10) and created from all log information stored in the log information storage unit 381. When the deleted document list display button 503 is depressed, a deleted document list screen 800 (FIG. 11) showing a list of document data deleted without being printed is displayed.

The deleted document list screen 800 in FIG. 11 shows a list of print data related to document data for which the item "operation type" is "deletion", and the item "print flag" is "not printed" in the log list file.

On the deleted document list screen 800, the number of documents deleted without being printed 801, the number of saved recording sheets 802, the number of users who deleted documents without performing printing 803, a document list 804, and a close button 805 are displayed.

The number of documents deleted without being printed 801 is the number of document data listed in the document list 804 and indicates here that 20 document data is included in the document list 804. The number of saved recording sheets 802 is the number of recording sheets to be used granting that document data included in the document list 804 is printed, and is a value obtained by adding up numbers recorded in a column "the number of recording sheets", to be described later, in the document list 804. Here, the value is 153, which corresponds to the number of saved recording sheets.

The number of users who deleted documents without performing printing 803 is the number of users indicated in the user name field of the document list 804, and the actual number of users when overlapping user names are counted as one. Here, the number of users who deleted documents without performing printing 803 is six, which corresponds to the number of persons contributed to saving of recording sheets.

Among the plurality of items in the operation log information 1001 in FIG. 5, for example, "user name", "access type", "document name", "the number of copies", "the number of pages", "one-sided/double-sided", "the number of faces per page", and "the number of recording sheets" are displayed in the document list 804.

A value calculated by multiplying the number of copies made from each piece of document data by the number of pages is recorded in the item "the number of recording sheets", and in one-sided printing, a value calculated by multiplying a value, which is obtained by dividing the number of pages by the number of allocations, by the number of copies is recorded as "the number of recording sheets". When the value obtained by dividing the number of pages by the number of allocations is not an integer, the number is rounded up to an integer.

In double-sided printing, a value calculated by multiplying a value, which is obtained by dividing the number of pages by the product of the number of allocations and 2, by the number of copies, is recorded as "the number of recording sheets". When the value obtained by dividing the number of pages by a product of the number of allocations and 2 is not an integer, the number is rounded up to an integer. When the close button 805 is depressed, the deleted document list screen 800 is closed.

Referring again to FIG. 8, when the setting-changed document list display button 504 is depressed, a document list screen 900 (FIG. 12) showing a list of document data printed after print settings were changed, is displayed.

The document list screen 900 in FIG. 12 shows a list of print data related to document data for which the item "operation type" among the plurality of items in the operation log information 1001 in FIG. 5 is "print setting change".

On the document list screen 900 in FIG. 12, the number of documents printed with changed settings 901, the number of recording sheets saved by setting change, 902, the number of users who printed documents with changed settings 903, a document list 904, and a close button 905 are displayed.

The number of documents printed after change of settings 901 is the number of document data listed in the document list 904 and indicates here that 10 document data is included in the document list 904. The number of recording sheets saved by changing settings 902 is a value obtained by adding up numbers recorded in a column of an item "the number of recording sheets at the time of submission" in document data differing in an item "the number of recording sheets at the time of submission" and an item "the number of recording sheets at the time of printing", which are to be described later, in document data included in the document list 904.

Here, "the number of recording sheets at the time of submission" corresponds to the number of recording sheets used to print document data before change of settings, print data before change of settings is document data which is not required to be printed. Thus, the value obtained by adding up the numbers recorded in the column of the item "the number of recording sheets at the time of submission" corresponds to the number of recording sheets saved by changing settings. In FIG. 12, the number of recording sheets saved by changing settings 902 is 126.

The number of users who printed documents after changing settings 903 is the number of users indicated in the user name field of the document list 904, and the actual number of users when overlapping user names are counted as one. Here, the number of users who printed documents after changing settings 903 is six, which corresponds to the number of persons contributed to saving of recording sheets.

In the document list 904, for example, "user name" and "document name" among the plurality of items in the operation log information 1001 in FIG. 5 are displayed, and further, "the number of recording sheets at the time of submission" and "the number of recording sheets at the time of printing" are displayed.

"The number of recording sheets at the time of submission" is the number of recording sheets used when document data corresponding to print data is printed in accordance with print settings when the print data is submitted to the printing apparatus 101, and "the number of recording sheets at the time of printing" is the number of recording sheets used when document data corresponding to print data is actually printed in accordance with print settings that have been changed. When the close button 905 is depressed, the document list screen 900 is closed.

Referring again to FIG. 8, when the close button 505 is depressed, the log management screen 500 is closed.

Figure 13:
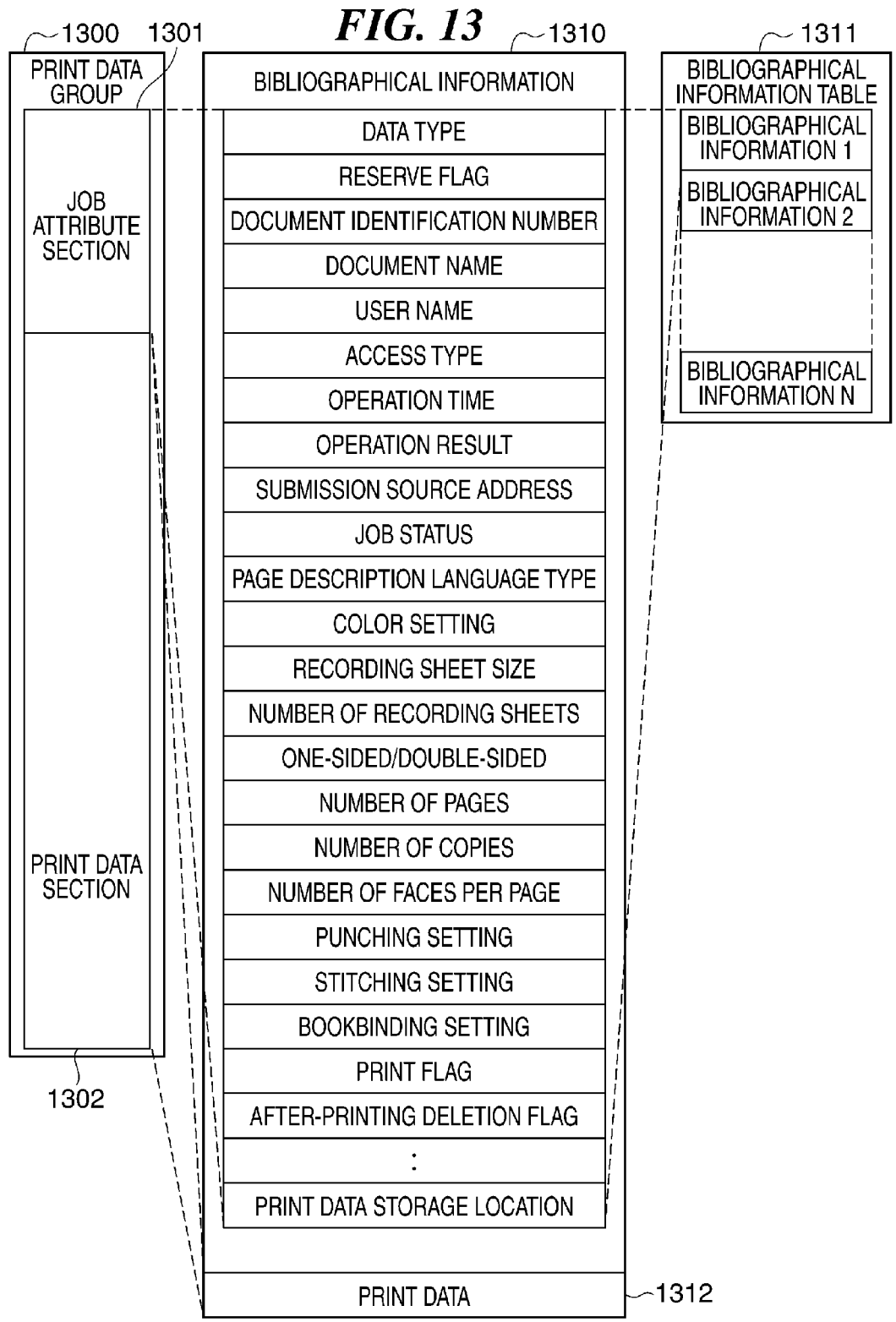
FIG. 13 is a view useful in explaining a print data group which the printing apparatus receives from a printer driver of the PC in FIG. 1.

FIG. 13 is a view useful in explaining a print data group 1300 which the printing apparatus 101 receives from a printer driver of the PC 102 in FIG. 1.

The print data group 1300 in FIG. 13 is comprised of a job attribute section 1301 and a print data section 1302. The job attribute section 1301 has bibliographical information 1310, and the print data section 1302 has print data 1312. The bibliographical information 1310 is stored in a bibliographical information table 1311.

The bibliographical information 1310 is comprised of a variety of information set for the print data 1312, and more specifically has information on "data type", "reserve flag", "document identification number", "document name", "user name", "access type", "operation time", "operation result", "submission source address", "job status", "page description language type", "color setting", "recording sheet size", "the number of recording sheets", "one-sided/double-sided", "the number of pages", "the number of copies", "the number of faces per page", "punching setting", "stitching setting", "bookbinding setting", "print flag", "after-printing delete flag", and "print data storage place".

"Data type" indicates a type of the bibliographical information 1310 stored in the job attribute section 1301, "reserve flag" indicates whether or not the print data 1312 is to be printed by reserve printing, and "document identification number" indicates a number for identifying document data comprised of a plurality of document data.

"Document name" is a name of print data received by the printing apparatus 101, "user name" is a name of a user who performed operation, and "access type" indicates a source of operation. As "access type", for example, "control panel" is recorded when a source of operation is the operating unit 212, "printer driver" is recorded when a source of operation is the printer driver of the PC 102, and "system" is recorded when a source of operation is a system which is executed in accordance with a program.

"Operation time" is a time at which an operation was performed. "Operation result" is a result of an operation that has been performed. Specifically, when an operation was completed with no error, "0" is recorded, and when an error occurred during an operation, an error code indicative of a reason for failure is recorded.

"Submission source address" is a network address of the PC 102 that has transmitted print data. "Job status" is a status of print data received by the printing apparatus 101. Specifically, "now printing", "waiting to be printed", or "print canceled" is recorded. "Page description language type" indicates a page description language used to instruct the printing apparatus 101 to perform printing, "dolor setting" is a print color setting such as black-and-white, color, or auto, "recording sheet size" is a recording sheet size such as A4, B4, or A3, and "the number of recording sheets" is the number of recording sheets required to perform printing in accordance with print conditions.

"One-sided/double-sided" indicates one-sided printing or double-sided printing, "the number of pages" is the number of pages which print data has, "the number of copies" is the number of copies to be made when print data is printed, and "the number of faces per page" is the number of allocations.

"Punching setting" including a punching position, the number of holes, and so on; "none", "short side", "long side", or the like is set as a punching position, and "none", "2", "3", "4", or the like is set as the number of holes. "Stitching setting" indicates a stitching position, the number of stitches, and so on; "none", "short side", "long side", "upper left", "upper right", "lower right", "lower left", "middle", or the like is set as a staple position, and "none", "single", "double", or the like is set as the number of stitches.

"Bookbinding setting" is a record as to whether or not to perform bookbinding, "print flag" is a record as to whether or not printing has been finished, and "after-printing delete flag" indicates whether or not to leave print data in the printing apparatus 101 or delete the print data from the printing apparatus 101 after printing of the print data is completed. "Print data storage place" is a temporary storage place for print data to be reserved in the printing apparatus 101.

The print data group 1300 may have only the print data section 1302, and in that case, the bibliographical information 1310 on print settings stored in the job attribute section 1301 is stored in the print data section 1302.

The bibliographical information table 1311, which is stored in the bibliographical information storage unit 361, is used to manage bibliographical information on all print data related to reserve printing. It should be noted that they are preferably managed using a database, an array, or a list.

Figure 14:
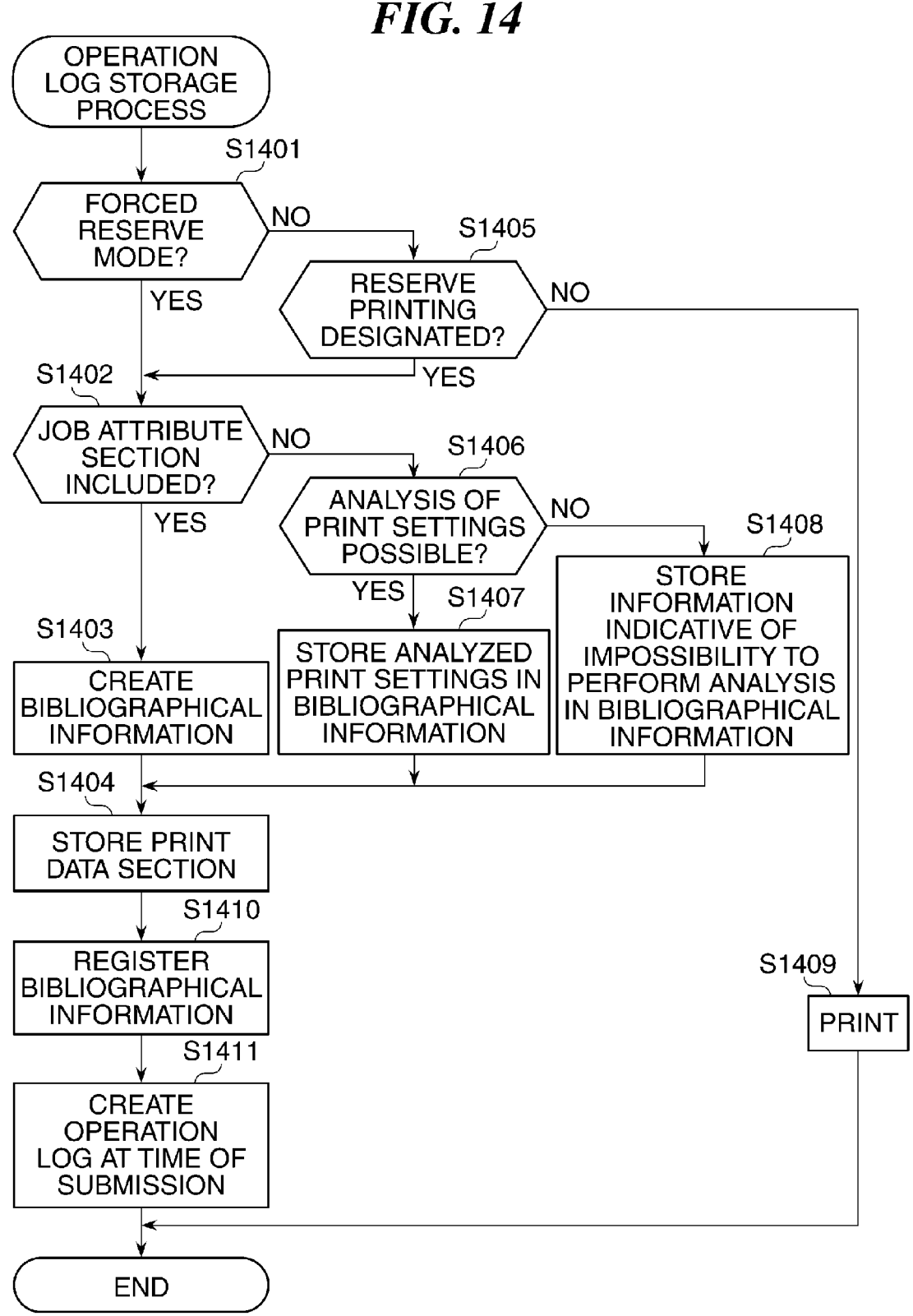
FIG. 14 is a flowchart showing the procedure of an operation log storage process which is carried out at the time of submission of print data by the printing apparatus in FIG. 1.

FIG. 14 is a flowchart showing the procedure of an operation log storage process which is carried out at the time of print data submission by the printing apparatus 101 in FIG. 1.

The process in FIG. 14 is carried out by the CPU 201 of the printing apparatus 101.

Referring to FIG. 14, first, when at the time of receiving print data, the printing apparatus 101 is in a forced reserve print mode in which every printing is performed by reserve printing (YES in step S1401), or the printing apparatus 101 is not in the forced reserve print mode (NO in the step S1401), and reserve printing is designated by a user (YES in step S1405), the CPU 201 determines whether or not the print data has the job attribute section 1301 (step S1402).

As a result of the determination in the step S1402, when the print data has the job attribute section 1301 (YES in step S1402), the CPU 201 reads print settings from the job attribute section 1301 and then causes the bibliographical information management unit 306 to create the bibliographical information 1310 (step S1403). Further, the CPU 201 causes the document management unit 305 to store the print data section 1302 as a file in the document information storage unit 351 and stores path information indicative of a storage location of the file in the document information storage unit 351 as a print data storage location in the bibliographical information 1310 (step S1404). At this time, a document identification number to be recorded in the bibliographical information 1310 is determined and recorded as "document identification number" in the bibliographical information 1310.

Then, the CPU 201 stores the bibliographical information 1310, which has been created by the bibliographical information management unit 306, in the bibliographical information table 1311 (step S1410), creates an operation log at the time of print data submission from the bibliographical information 1310, causes the log management unit 308 to store the created operation log in the log management table 1002 (step S1411), and terminates the present process. In the operation log at the time of print data submission, for example, "submission", "success", "printer driver", and "not printed" are set as "operation type", "operation result", "access type", and "print flag", respectively.

As a result of the determination in the step S1402, when the print data does not have the job attribute section 1301 (NO in step S1402), the CPU 201 determines whether or not it is possible to perform analysis as to whether or not the print data section 1302 has bibliographical information on print settings (hereafter referred to as "analysis of print settings") (step S1406).

As a result of the determination in the step S1406, when analysis of the print settings is possible (YES in the step S1406), the CPU 201 stores the analyzed print settings in the bibliographical information table 1311 (step S1407) and carries out the processes in the step S1404 and the subsequent steps.

On the other hand, as a result of the determination in the step S1406, when analysis of the print settings is impossible (NO in the step S1406), the CPU 201 stores, in the bibliographical information table 1311, information to the effect that analysis is impossible (step S1408) and carries out the processes in the step S1404 and the subsequent steps.

It should be noted that the determination in the step S1406 is made by analyzing "page description language type" including information on print positions of characters, character type, and so on, and it is thus unnecessary to analyze all items of bibliographical information which the print data section 1302 has.

It should be noted that when at the time of receiving print data, the printing apparatus 101 is not in the forced reserve print mode (NO in the step S1401), and reserve printing is not designated by the user (NO in the step S1405), the CPU 201 prints the print data (step S1409) and terminates the present process.

According to the process in FIG. 14, when the printing apparatus 101 is in the forced reserve print mode (YES in the step S1401), or when the printing apparatus 101 is not in the forced reserve print mode (NO in the step S1401) and reserve printing is designated by the user (YES in the step S1405), the bibliographical information 1310 is stored in the bibliographical information table 1311 (step S1410), and therefore, it is possible to manage the bibliographical information 1310 on all reserve printing, and based on the bibliographical information 1310, grasp logs of operations performed when print data relating to all reserve printing is submitted.

Figure 15:
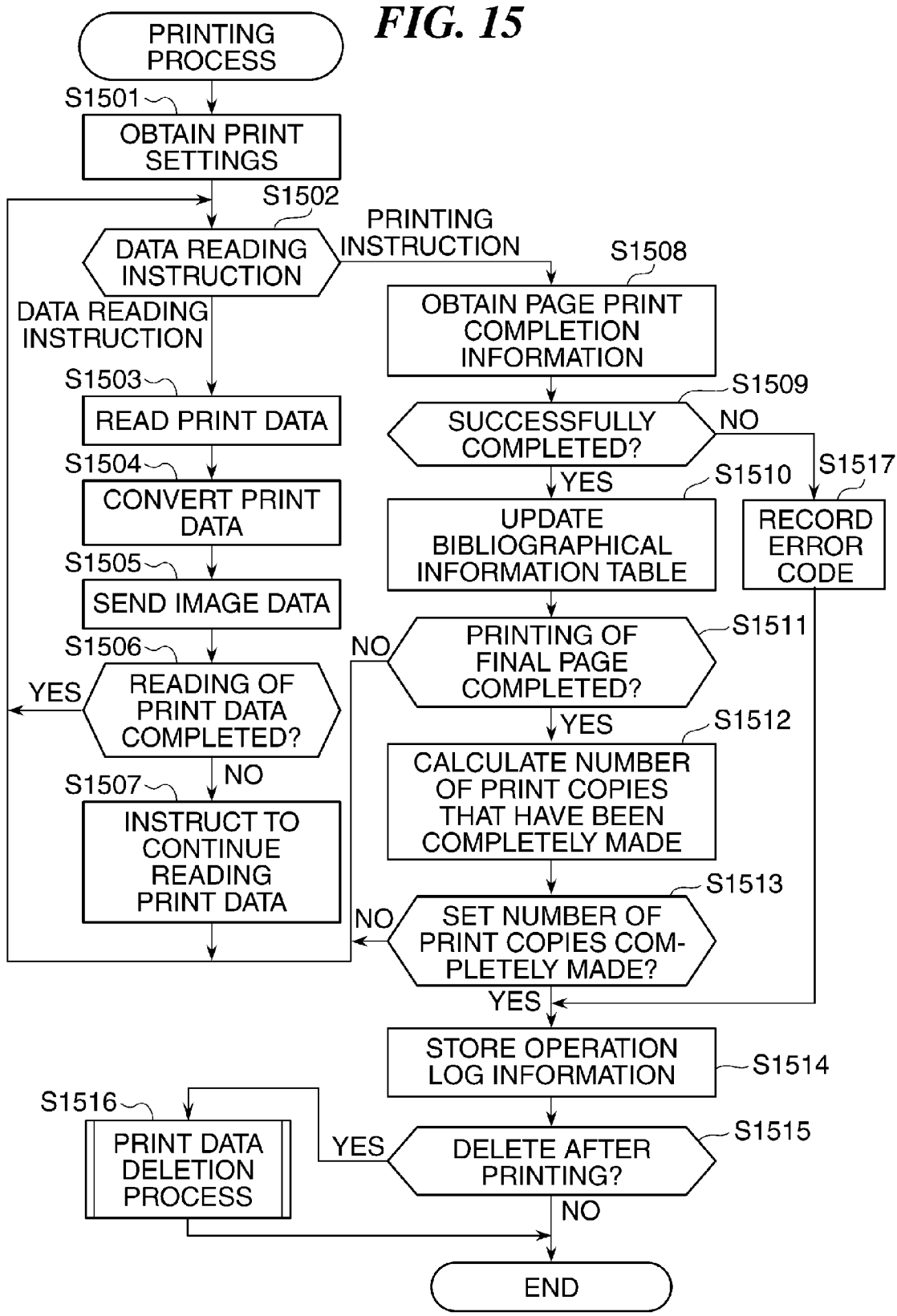
FIG. 15 is a flowchart showing the procedure of a printing process for a reserved print document, which is carried out by depressing a print start button on the reserve print screen in FIG. 4 is depressed.

FIG. 15 is a flowchart showing the procedure of a printing process for a reserved print document, which is carried out by depressing the print start button 407 on the reserve print screen 400 in FIG. 4 is depressed.

The process in FIG. 15 is carried out by the CPU 201 of the printing apparatus 101.

Referring to FIG. 15, the CPU 201 obtains the bibliographical information 1310 on the document data 422, which is selected in the document list 402, and the print data 1312 and also obtains print settings from the bibliographical information 1310 (step S1501). The CPU 201 updates the bibliographical information table 1311 by setting "now printing" as "job status" in the bibliographical information 1310 and determines whether or not a data reading instruction to read print data has been issued (step S1502).

The data reading instruction includes a data storage location, a read size, and a read start position. The data storage location indicates path information on a file recorded in a print data storage location in the bibliographical information 1310, and the read size indicates the amount of print data transmitted to the printing apparatus 101 at a time and specified in advance by a program, and the read start position indicates a position in print data at which reading suited for the read size is started.

As a result of the determination in the step S1502, when the data reading instruction to read the print data 1312 has been issued, the CPU 201 reads out the print data 1312 corresponding to the read size specified in advance by the program in accordance with the data reading instruction (step S1503) and stores the read print data 1312 in a temporary storage area of the RAM 202. At this time, when it is possible to read all of the print data 1312, information to the effect that reading of print data has been completed is additionally stored in the RAM 202.

Then, the CPU 201 controls the print data processing unit 341 to convert the read print data from a PDL code into a bitmap image (image data), and as the need arises, controls the image processing unit 342 to perform color conversion and zooming (step S1504). After that, the CPU 201 controls the device control unit 331 to send data on the bitmap image to the print control unit 333 (step S1505). Based on whether or not the above described information to the effect that reading of the print data has been completed is stored in the RAM 202, the CPU 201 determines whether or not reading of the print data has been completed (step S1506).

When the CPU 201 determines in the step S1506 that reading of the print data has been completed, the process immediately returns to the step S1502, and when reading of the print data has not been completed, the CPU 201 issues a data reading instruction to continue reading the print data (step S1507), and the process then returns to the step S1502.

On the other hand, as a result of the determination in the step S1502, when an instruction to print the print data, not the instruction to read the print data, has been issued, the CPU 201 prints the read print data and obtains page printing completion information (step S1508). The page printing completion information includes a print result, a last page flag, and a last section flag. The print result indicates whether or not printing is successful, the last page flag indicates that the printed page is the last page of the read print data, and the last section flag indicates that the printed page is the last section of the read print data.

Then, the CPU 201 determines whether or not the read print data has been successfully completed (step S1509). This determination is carried out based on whether or not the print result in the page print completion information indicates a success or a failure.

As a result of the determination in the step S1509, when the read print data has been successfully completed (YES in the step S1509), the CPU 201 calculates the number of recording sheets used in printing, records the calculated number of sheets as "the number of recording sheets" in the bibliographical information 1310 and updates the bibliographical information table 1311 by setting "printed" as "print flag" in the bibliographical information 1310 (step S1510), and determines whether or not the last page of the print data has been printed (step S1511).

As a result of the determination in the step S1511, when the last page of the print data has not been printed (NO in the step S1511), the process returns to the step S1502, and when the last page of the print data has been printed (YES in the step S1511), the CPU 201 calculates the number of copies at the end of printing (step S1512) and determines whether or not printing to make the set number of copies has been completed (step S1513).

As a result of the determination in the step S1513, when printing to make the set number of copies has not been completed (NO in the step S1513), the process returns to the step S1502, and when printing to make the set number of copies has been completed (when the set number of copies matches the calculated number of copies at the end of printing) (YES in the step S1513), the CPU 201 stores the operation log information 1001, which has been created using the print information in the bibliographical information 1310, in the log management table 1002 (step S1514) and determines whether or not "after-printing delete flag" in the bibliographical information 1310 indicates that the print data is to be deleted after printing (step S1515).

When the CPU 201 determines in the step S1515 that it is indicated that the print data is to be deleted after printing (YES in the step S1515), the CPU 201 carries out a print data deletion process in FIG. 16, to be described later, to delete the print data 1312, records as "operation result" in the operation log information 1001, information to the effect that deletion is successful, and stores the record in the log management table 1002 (step S1516), and terminates the present process. On the other hand, when it is not indicated that the print data is to be deleted after printing (NO in the step S1515), the CPU 201 terminates the present process without carrying out the print data deletion process in FIG. 16.

When the CPU 201 determines in the step S1509 that printing of the read print data has not been successfully completed (the print result in the page print completion information indicates a failure) (NO in the step S1509), the CPU 201 records an error code indicative of a reason for unsuccessful printing as a result in the page print completion information (step S1517) and carries out the processes in the step S1514 and the subsequent steps.

According to the process in FIG. 15, the number of recording sheets used in printing is recorded for the item "the number of recording sheets", the operation log information 1001 is created using print information in the bibliographical information 1310 for which "printed" is recorded for the item "print flag", and the created operation log information 1001 is stored in the log management table 1002 (the steps S1510 to S1514).

Moreover, when "after-printing delete flag" in the bibliographical information 1310 indicates that print data is to be deleted after printing (YES in the step S1515), the print data 1312 is deleted, and information to the effect that deletion is successful is recorded as "operation result" in the operation log information 1001 and stored in the log management table 1002 (step S1516). Namely, even when print data is deleted after printing as a result of reference to the log management table 1002, the number of recording sheets used to print the deleted print data is grasped.

Figure 16:
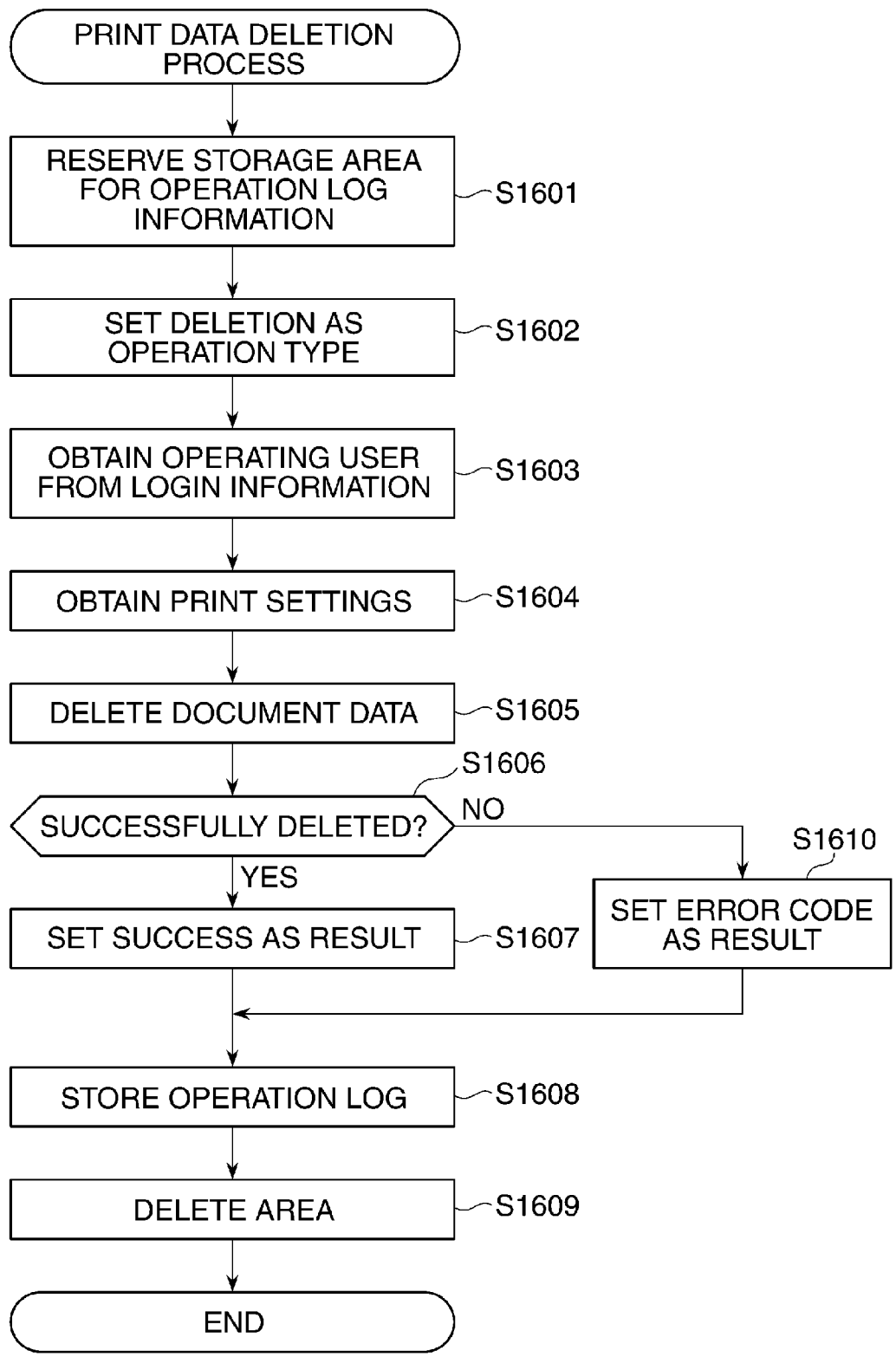
FIG. 16 is a flowchart showing the procedure of a print data deletion process which is carried out in step S1516 in FIG. 15.

FIG. 16 is a flowchart showing the procedure of the print data deletion process which is carried out in the step S1516 in FIG. 15.

The process in FIG. 16 is carried out by the CPU 201 of the printing apparatus 101. It should be noted that the process in FIG. 16 is carried out not only in the step S1516 in FIG. 15 but also when the document delete button 405 in FIG. 4 is depressed.

Referring to FIG. 16, the CPU 201 reserves an area on the RAM 202 for storing the operation log information 1001 (step S1601), sets "delete" as "operation type" in the operation log information 1001 (step S1602), and controls the user management unit 307 to obtain a user name of a user who is using the operating panel 212 and sets the obtained user name as "user name" in the operation log information 1001 (step S1603).

Further, the CPU 201 obtains print settings for printing such as "color setting", "recording sheet size", "the number of recording sheets", "the number of pages", "the number of copies", and "print flag" set in the bibliographical information 1310 and sets them for the corresponding items in the operation log information 1001 (step S1604). The CPU 201 also controls the document management unit 305 to delete the print data 1312 relating to the document data 422 selected in the document list 402 and controls the bibliographical information management unit 306 to delete the bibliographical information 1310 on the same document from the bibliographical information table 1311 (step S1605), and determines whether or not those deletions are successful (step S1606).

As a result of the determination in the step S1606, when the deletions are successful, the CPU 201 sets "success" as "operation result" in the operation log information 1001 (step S1607), controls the log management unit 308 to store the operation log information 1001 in the log management table 1002 (step S1608), deletes the area reserved on the RAM 202 (step S1609), and terminates the present process.

On the other hand, as a result of the determination in the step S1606, when the deletions are not successful, the CPU 201 records an error code indicative of a reason for failure as a result in the operation log information 1001 (step S1610) and carries out the processes in the step S1608 and the subsequent steps.

According to the process in FIG. 16, "delete" is set for the item "operation type" in the operation log information 1001, and "not printed" or "printed" is set for the item "print flag" (the steps S1602 to S1604), the print data 1312 related to the document data 422 selected in the document list 402 is deleted (the step S1605), and the operation log information 1001 is stored in the log management table 1002 (the step S1608).

Thus, by referring to the log management table 1002, it is possible to determine whether or not deleted print data was deleted after printed, or deleted print data was deleted before printed. Further, print settings are reflected on items such as "the number of recording sheets" in the operation log information 1001 as well (step S1604), and hence the number of recording sheets used to print printed data among deleted print data is grasped, and the number of recording sheets which should have been used for print data that was not printed is grasped.

Moreover, information on user names of users who have submitted print data are also stored as the operation log information 1001 in the log management table 1002, and hence users with great awareness about saving of recording sheets is grasped.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-031906, filed Feb. 21, 2014, which is hereby incorporated by reference herein in its entirety.

What is claimed is:

1. A printing apparatus comprising:
a printer;
a storage storing image data transmitted from an information processing apparatus;
an operation panel configured to receive a print start instruction from a user;
at least one processor; and
a memory,
wherein the at least one processor is connected to the memory and configured to:
control the printer to print the image data, in response to the print start instruction, in accordance with a print condition;
change the print condition to not print the image data;
delete the image data from the storage in accordance with a deletion instruction received by the operation panel;
record a deletion log in response to the deletion of the image data, the deletion log including a print flag indicative of whether the image data has been printed by the printer or not and a number of recording sheets required to print the image data; and
calculate the number of recording sheets saved by changing the print condition to not print the image data.

2. The printing apparatus according to claim 1, wherein:
in one-sided printing, the number of recording sheets is obtained by multiplying a first value, which is obtained by dividing the number of pages of the image data by the number of allocations, by the number of copies, and
in double-sided printing, the number of recording sheets is obtained by multiplying a second value, which is obtained by dividing the number of pages of the image data by a product of the number of allocations and 2, by the number of copies.

3. The printing apparatus according to claim 2, wherein in a case where the first or second value is expressed by a decimal, the first or second value is rounded up to an integer.

4. The printing apparatus according to claim 1, further comprising a display configured to display the number of recording sheets saved by changing the print condition to not print the image data.

5. A control method for a printing apparatus comprising:
a printer;
a storage storing image data transmitted from an information processing apparatus;
an operation panel configured to receive a print start instruction from a user;
at least one processor; and
a memory,
wherein the control method comprises the steps of:
controlling the printer to print the image data, in response to the print start instruction, in accordance with a print condition;
changing the print condition to not print the image data;
deleting the image data from the storage in accordance with a deletion instruction received by the operation panel;
recording a deletion log in response to the deletion of the image data, the deletion log including a print flag indicative of whether the image data has been printed by the printer or not and a number of recording sheets required to print the image data; and
calculating the number of recording sheets saved by changing the print condition to not print the image data.

6. A non-transitory computer-readable storage medium storing a program executable by a computer to execute a control method for a printing apparatus comprising:
a printer;
a storage storing image data transmitted from an information processing apparatus; and
an operation panel configured to receive a print start instruction from a user;
wherein the control method comprises the steps of:
controlling the printer to print the image data, in response to the print start instruction, in accordance with a print condition;
changing the print condition to not print the image data;
deleting the image data from the storage in accordance with a deletion instruction received by the operation panel;
recording a deletion log in response to the deletion of the image data, the deletion log including a print flag indicative of whether the image data has been printed by the printer or not and a number of recording sheets required to print the image data; and
calculating the number of recording sheets saved by changing the print condition to not print the image data.

7. An image processing system comprising:
a printing apparatus; and
an information processing apparatus configured to be connected to the printing apparatus,
wherein the printing apparatus comprises:
a printer
a storage storing image data transmitted from an information processing apparatus;
an operation panel configured to receive a print start instruction from a user;
at least one processor; and
a memory,
wherein the at least one processor is connected to the memory and configured to:
control the printer to print the image data, in response to the print start instruction, in accordance with a print condition;
change the print condition to not print the image data;
delete the image data from the storage in accordance with a deletion instruction received by the operation panel;
record a deletion log in response to the deletion of the image data, the deletion log including a print flag indicative of whether the image data has been printed by the printer or not and a number of recording sheets required to print the image data; and
calculate the number of recording sheets saved by changing the print condition to not print the image data; and
wherein the deletion log is recorded by way of the information processing apparatus.

* * * * *